United States Patent
Ohrvall et al.

(10) Patent No.: US 7,393,006 B2
(45) Date of Patent: Jul. 1, 2008

(54) AIRBAG DEVICE FOR MOTOR VEHICLES

(75) Inventors: Henrik Ohrvall, Allingsas (SE);
Andreas Melander, Trollhattan (SE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 11/767,024

(22) Filed: Jun. 22, 2007

(65) Prior Publication Data

US 2007/0241544 A1    Oct. 18, 2007

Related U.S. Application Data

(63) Continuation of application No. PCT/EP2005/013689, filed on Dec. 20, 2005.

(51) Int. Cl.
*B60R 21/213* (2006.01)
(52) U.S. Cl. .................................. 280/730.2
(58) Field of Classification Search ............. 280/730.2, 280/743.1, 728.2
See application file for complete search history.

(56) References Cited

U.S. PATENT DOCUMENTS

| | | | | |
|---|---|---|---|---|
| 6,010,149 | A * | 1/2000 | Riedel et al. | 280/730.2 |
| 6,334,626 | B2 * | 1/2002 | Nakajima et al. | 280/730.2 |
| 6,409,210 | B1 * | 6/2002 | Emerling | 280/730.2 |
| 6,457,740 | B1 * | 10/2002 | Vaidyaraman et al. | 280/730.2 |
| 6,695,342 | B2 * | 2/2004 | Tanase et al. | 280/730.2 |
| 6,851,707 | B2 * | 2/2005 | Bakhsh et al. | 280/730.2 |
| 6,899,350 | B2 * | 5/2005 | Bakhsh et al. | 280/730.2 |
| 6,948,736 | B2 * | 9/2005 | DePottey et al. | 280/728.2 |
| 7,159,895 | B2 * | 1/2007 | Aoki et al. | 280/730.2 |
| 2002/0153713 | A1 * | 10/2002 | Fischer | 280/730.2 |
| 2002/0180192 | A1 * | 12/2002 | Tanase et al. | 280/730.2 |
| 2004/0195809 | A1 * | 10/2004 | Tanase et al. | 280/730.2 |
| 2005/0062262 | A1 * | 3/2005 | Williams | 280/728.2 |
| 2007/0241544 | A1 * | 10/2007 | Ohrvall et al. | 280/730.2 |

FOREIGN PATENT DOCUMENTS

| | | |
|---|---|---|
| DE | 100 56 298 A 1 | 5/2002 |
| DE | 101 15 063 A 1 | 11/2002 |
| EP | 0 808 257 B1 | 2/1996 |
| EP | 0 832 795 B1 | 9/1997 |
| EP | 1 110 825 B1 | 12/2000 |
| EP | 1 264 742 B1 | 2/2005 |

* cited by examiner

*Primary Examiner*—Kevin Hurley
*Assistant Examiner*—Karen Amores
(74) *Attorney, Agent, or Firm*—Brinks Hofer Gilson & Lione

(57) ABSTRACT

An airbag device for protecting motor vehicle occupants is disclosed. The airbag device comprises an airbag, which is accommodated folded-up in the roof area of the vehicle prior to inflation. The airbag unfolds downwards curtain-like when triggered, with a first section of the folded-up airbag extending in the longitudinal direction of the vehicle from its roof frame. A second airbag section is arranged within the roof strut above the windshield, which runs at right angles to the longitudinal direction of the vehicle. The second section of the airbag is bent inwards around a folding point and disposed above the windshield. A fastening means arranged in the vicinity of the folding point fastens the first section of the folded airbag running along the roof frame to the roof frame.

14 Claims, 3 Drawing Sheets

AIRBAG DEVICE FOR MOTOR VEHICLES

CROSS-REFERENCE TO RELATED APPLICATIONS

This application is a continuation of, and claims priority to, PCT/EP2005/013689, filed 20 Dec. 2005, which claimed priority to German patents DE 10 2004 061 898.4 and DE 20 2004 019 790.1.

BACKGROUND OF THE INVENTION

The invention relates to an airbag device for protecting vehicle occupants, said airbag device comprising an airbag, which is accommodated folded-up in the roof area of the vehicle and which unfolds downwards curtain-like when triggered, wherein one section of the folded-up airbag extends in the longitudinal direction of the vehicle along its roof frame.

Patent EP 0 808 257 B1 describes an airbag device having the above features. In one embodiment, the airbag belonging to this airbag device extends along the associated roof frame over the length of the vehicle passenger compartment, wherein the airbag is divided into single chambers that run vertically. Before being triggered, the airbag is folded up and accommodated along the roof frame underneath a vehicle interior covering. The folded airbag can additionally be accommodated in a module housing. To this end, the airbag device known in the art covers the region of the side doors of the vehicle, including the side windows.

It would be advantageous to develop an airbag device of the type mentioned in the introduction in such a manner that it also effectively provides protection in the areas of the motor vehicle located in front of the vehicle occupants in order to protect the vehicle occupant in an accident not only against side impact, but also against a frontal impact on parts of the vehicle.

A solution to this problem, including advantageous embodiments and developments of the invention, follows from the content of the following description and claims.

SUMMARY OF THE INVENTION

One aspect of the invention is to arrange within the roof strut, which runs at right angles to the longitudinal direction of the vehicle, an additional section of the airbag, said section being bent inwards around a folding point and disposed above the windshield opposite the airbag section that is folded-in along the roof frame. A fastening means arranged in the vicinity of the folding point fastens the folded airbag section running along the roof frame to the roof frame. An advantage of this embodiment is that it is easy to accommodate the airbag in the area of the vehicle located in front of the vehicle occupants. The roof strut that is located above the windshield and perpendicular to the longitudinal direction of the vehicle has adequate space to accommodate the folded airbag region in question in a manner similar to the space along the laterally running roof frame. The fastening of the airbag is fixed in such a manner that the airbag can unfold in various ways, depending on the design of the vehicle.

In a first embodiment of the invention, an additional section of the airbag is arranged to cover the front A-pillar of the motor vehicle when the airbag is inflated. Prior to inflation, its open end is fixed to the roof strut by means of a detachable holding means. When the airbag device is triggered, the bent part of the airbag detaches from its fastening on the roof strut and swivels around a front fastening point on the roof frame under inflation pressure. The airbag inflates into a position which is continuous with the airbag region running along the roof frame, with the forward region of the airbag coming to rest in front of and finally covering the front A-pillar of a motor vehicle after descending and unfolding completely. The front fastening point is provided near a folding point and serves as a pivot, with the lower portion of the airbag at the folding point straightening upon inflation. An airbag covering the A-pillar of a motor vehicle is known in principle from EP 0 832 795 B1.

According to one example embodiment of the invention, it is provided that at least one additional fastening means permanently fastens the bent airbag section to the roof strut between the detachable holding means and the folding point. In this embodiment of the invention, a subsection also remains in a bent position between the folding point and the fastening point located on the roof strut after the airbag has unfolded and inflated, so that only the open end of the airbag section is situated in front of the A-pillar. This design of a zigzag shape realizes early restraint of the head of the occupant in the upper region of the vehicle in the event of an oblique impact. Another advantage is that the airbag features greater stiffness in its inflated state as a result of this special shape.

In an alternative embodiment of the invention, it is provided that the additional section of the airbag is permanently fastened to the roof strut by means of a fastening means which simultaneously serves as linkage for the sun visor mounted on the roof strut. In this configuration, the bent section of the airbag retains its position when the airbag unfolds, so that the airbag, which unfolds downwards, covers the vehicle corner located in front of the occupant, including the transition of the roof strut to the lateral roof frame. If a sun visor, as usual, can be detached from its mounting when situated toward the vehicle interior and can rotate or swivel around its fastening when situated toward the vehicle exterior, then there exists the additional advantage that the permanent fastening of the bent airbag section can also simultaneously be used as fixed mounting for the sun visor so that additional fastening means are not necessary.

In this embodiment of the invention, it can also be provided that the bent airbag section on the roof strut extends beyond the fastening means and that its end region is fixed to the roof strut by a detachable holding means, wherein the portion of the airbag that extends beyond the fastening means likewise detaches from the roof strut when triggered and swivels in front of the A-pillar of the vehicle.

In both embodiments of the invention, it can be provided that the holding means for fixing the open end of the bent airbag section is configured as linkage for the sun visor mounted on the roof strut. If a sun visor, as usual, can be detached from its mounting when situated toward the vehicle interior and can rotate or swivel around its fastening when situated toward the vehicle exterior, then there exists the additional advantage that the permanent fastening of the bent airbag section to the roof strut can also simultaneously be used as fixed mounting for the sun visor so that a point of attachment already needed for the sun visor is also used for fastening the airbag.

In conventional manner, the holding means for detachably fastening the bent airbag section to the roof strut can be a shackle having a predetermined break point; alternatively, a detachable clip connection can also be provided.

To allow the bent section of the airbag to move as close as possible to the A-pillar of the vehicle, it can be provided that the chambers of the airbag are aligned in such a manner that the longitudinal axis of each chamber is inclined at an angle between 30° and 60° to the vertical, namely the same direction of inclination as the A-pillar; preferably, this angle equals approximately 45°. This will permit an adaptation to different vehicle types.

If an airbag device is adapted to a particular vehicle type, the airbag may have a plurality of single chambers, the longitudinal axis of each chamber having an inclination corresponding to the inclination of the A-pillar to the vertical.

DETAILED DESCRIPTION OF THE INVENTION

Figure 1:
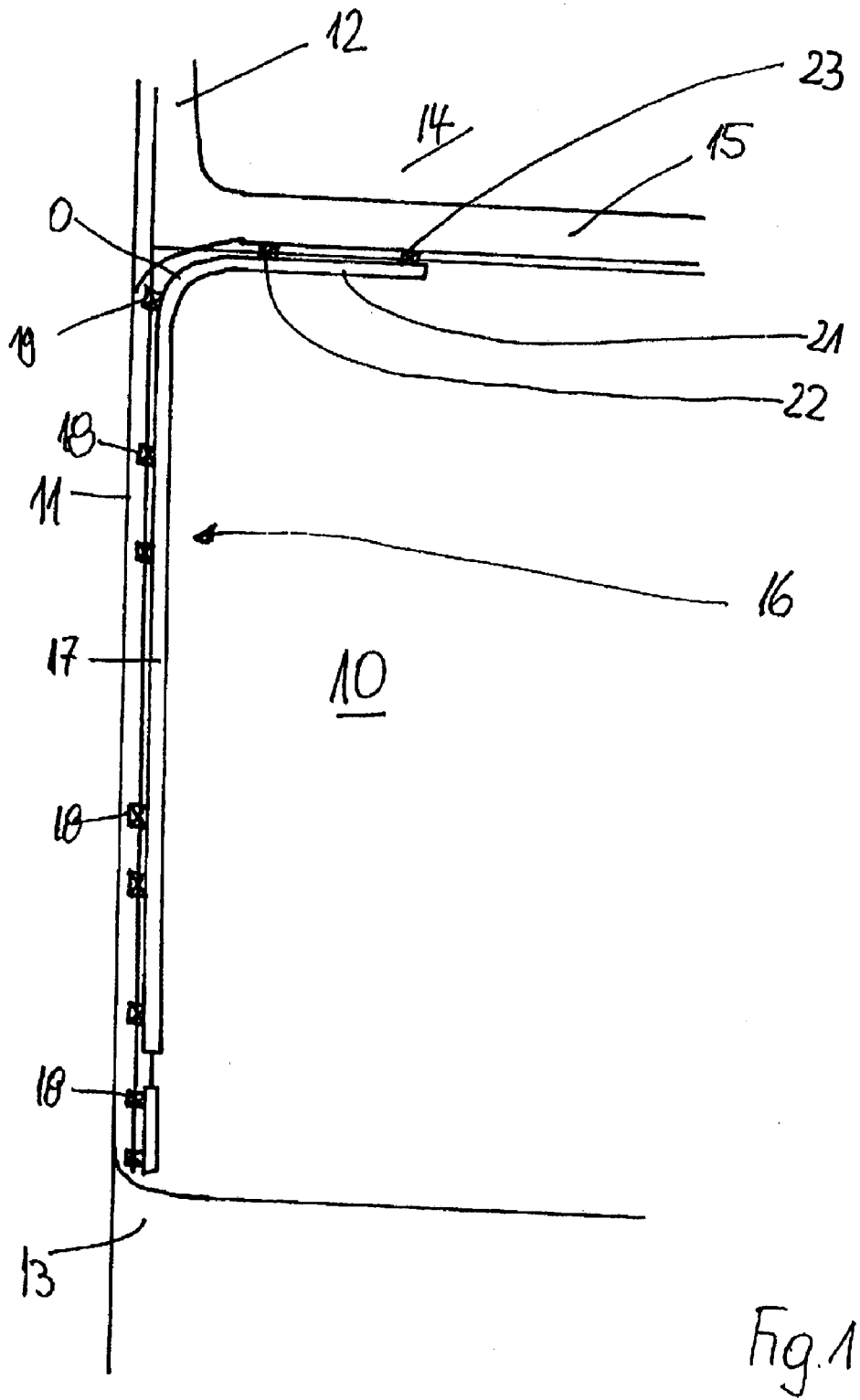
FIG. 1 is a schematic top view into the interior of a motor vehicle showing a built-in airbag device with the airbag folded up prior to inflation.

The following description is merely exemplary in nature. It is not intended to limit the invention or its application or uses. FIG. 1 shows a top view of vehicle 10 having a roof frame 11 running in the longitudinal direction. As seen in the side view of FIG. 5, on the front end of roof frame 11 is arranged an inclined A-pillar 12 and on the rear end of roof frame 11 is arranged a C-pillar 13. A front roof strut 15, which runs perpendicular to the longitudinal axis of the vehicle and is located above a windshield 14, is attached to the roof frame 11 and the neck of the A-pillar 12.

Built into a vehicle of this type is an airbag device 16 comprising a first airbag region 17, which extends in the longitudinal direction of the vehicle. Airbag device 16 is built into the vehicle 10 so as to follow the roof frame 11 and is mounted underneath a vehicle interior covering. A plurality of fastening means 18, which are distributed along the longitudinal length of the roof frame 11, fastens the first airbag region 17 to the roof frame 11. In the vicinity of the roof strut 15, the airbag device 16 has an airbag section 21. Airbag section 21 commences near a folding point 20 and runs along the roof strut 15. A fastening means 19 for fastening the front of airbag region 17, which transitions to the folding point 20, is provided adjacent to the folding point 20.

A detachably configured holding means 23 connects the end region of the bent airbag section 21 to the roof strut 15. In the illustrated example embodiment, a fastening means 22 permanently fastens the bent airbag section 21 to the roof strut 15 between the detachable holding means 23 and the folding point 20.

Figure 2:
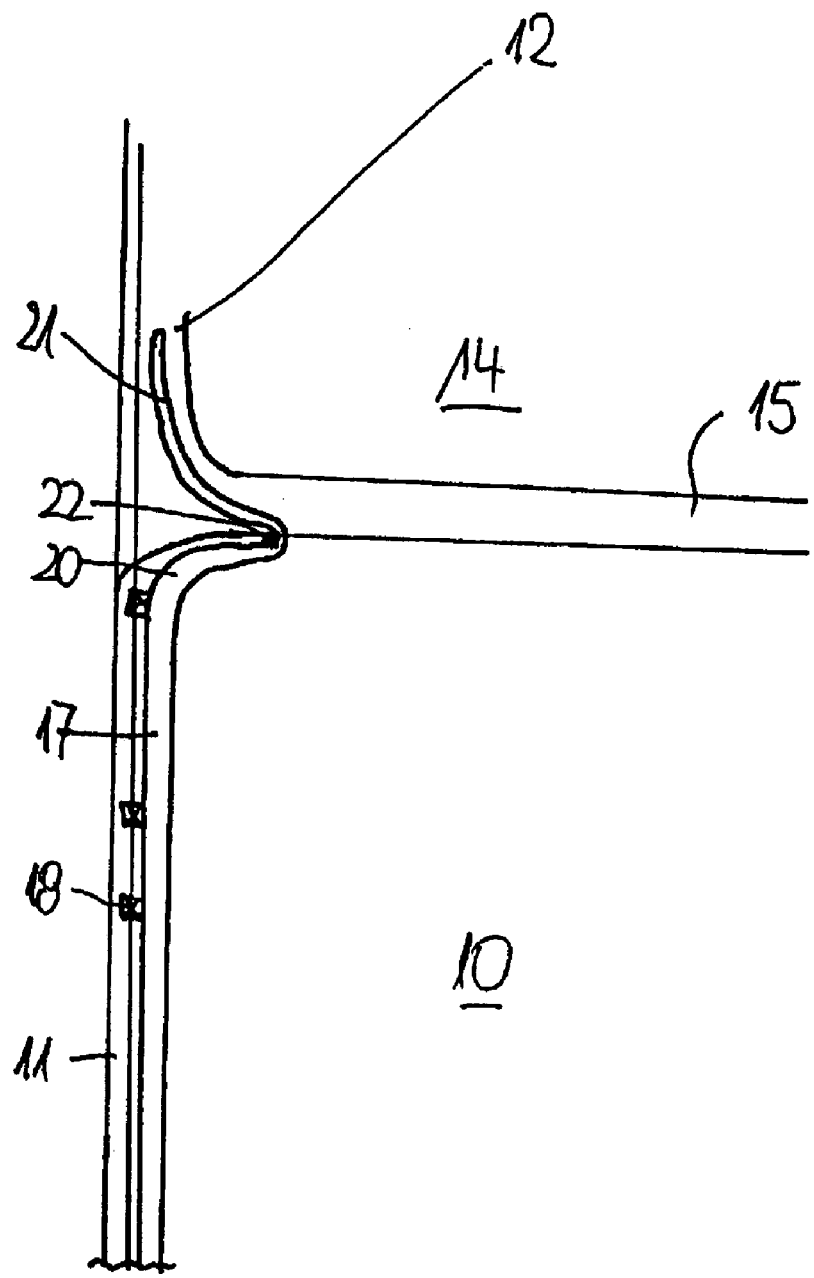
FIG. 2 is a schematic top view into a motor vehicle showing the airbag of FIG. 1 unfolded and inflated.
Figure 5:
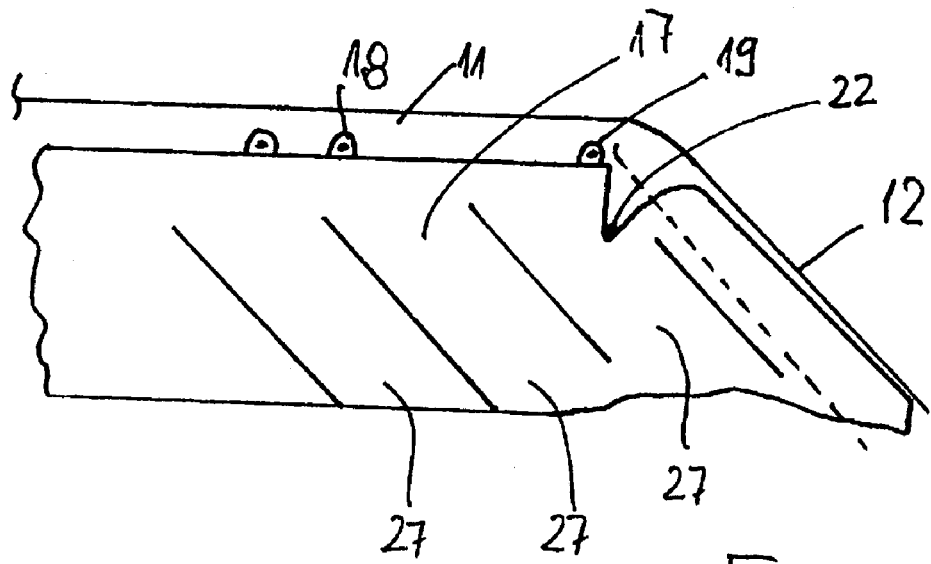
FIG. 5 is a side view of the airbag unfolded and inflated, showing the forward portion covering the A-pillar.

FIG. 2 and FIG. 5 show the airbag in an inflated state. When the airbag unfolds and inflates, the bent airbag section 21 will detach from the roof strut in the vicinity of the holding means 23 because of the acting unfolding pressure. Upon inflation, the bent airbag section 21 endeavors to occupy an elongated position in continuation, so to speak, of the deployed airbag region 17 which runs longitudinally along the roof frame 11. To this end, the end region of the detached, bent airbag section 21 positions itself in front of the A-pillar 12 of the vehicle 10 and covers it. Fastening means 22 on the roof strut 15 may be arranged to prevent the detached, bent airbag section 21 attached to airbag region 17 from extending completely beyond the folding point 20. If so configured, the airbag device 16 will assume a zigzag-like shape in the vicinity of the transition between the roof frame 11 and A-pillar 12, so that early restraint of the head of the occupant will be realized in an advantageous manner in the event of an oblique impact.

Figure 3:
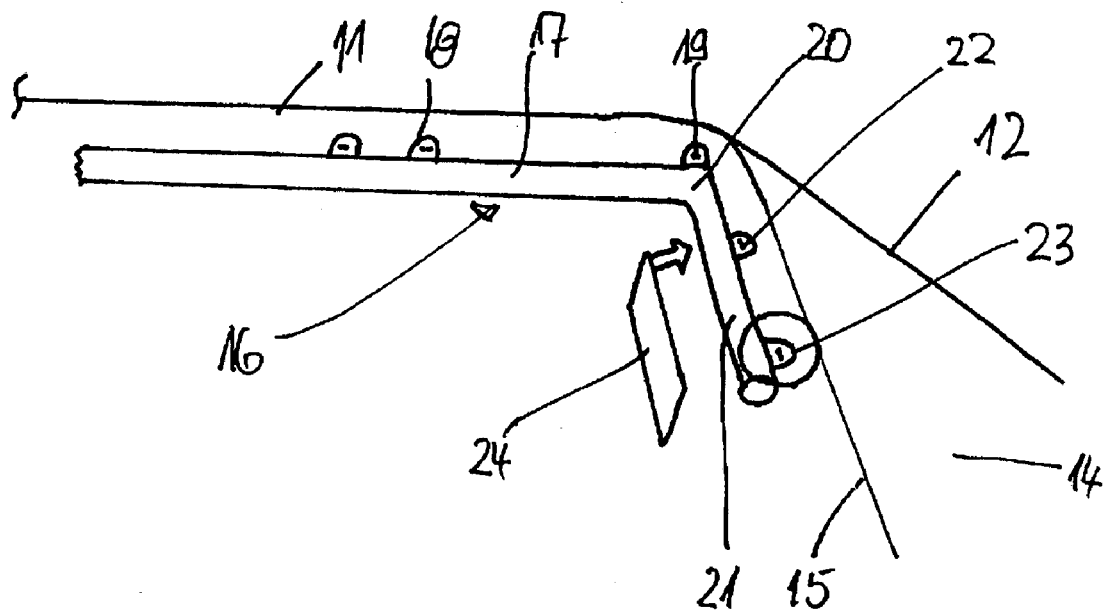
FIG. 3 is a schematic perspective view of the interior of a motor vehicle, showing the airbag folded up prior to inflation, arranged along the lateral roof frame and roof strut.

FIG. 3 depicts, in schematic perspective view, how both the fastening means 22 and the holding means 23 can simultaneously be used to mount or fasten a sun visor 24, which is provided in the vehicle, to the roof strut 15, so that additional fastening means are not required.

Figure 4:
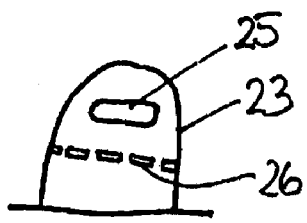
FIG. 4 depicts a holding means for detachable fixing of the folded airbag region in an enlarged detail drawing.

FIG. 4 is an enlarged side view of detachable holding means 23. It is possible for example to configure the holding means 23 as a shackle in such a manner that a predetermined breaking point 26 is arranged between the eyelet 25 for fixing the fastening means 22 and the airbag attached to the holding means 23. Alternatively, it is also possible to structure detachable holding means 23 as a detachable clip connection, which is not further illustrated.

Finally, as shown in FIG. 5, in order to provide an appropriate inflation direction, the airbag device 16 may comprise a plurality of single chambers 27, the longitudinal axis of each chamber having an inclination corresponding to the inclination of the A-pillar 12 to the vertical. It can in general be provided that the inclination of the longitudinal axis of the corresponding chambers 27 approximately 30° to 60°, preferably 45° to the vertical.

The features disclosed in the present description, claims, abstract and drawing can be utilized, either individually or in any arbitrary combinations with one another, for the realization of the invention in its various embodiments. While the above description constitutes one or more embodiments of the present invention, it will be appreciated that the invention is susceptible to modification, variation, and change without depicting from the proper scope and fair meaning of the accompanying claims.

The invention claimed is:

1. An airbag device for protecting occupants in a motor vehicle having a roof frame in a roof area which extends longitudinally with the direction of the vehicle, and a roof strut above a windshield and at a right angle to the longitudinal direction of the vehicle, said airbag device comprising:

an airbag which prior to inflation is accommodated in a folded-up state in the roof area, and which inflates downward to extend curtain-like in the longitudinal direction of the vehicle;

a first section of the airbag disposed longitudinally along the roof frame;

a second section of the airbag bent inwards from the first section of the airbag around a folding point and disposed above the windshield along the roof strut;

a fastening means in the vicinity of the folding point for fastening the first section of the airbag to the roof frame; and a detachable holding means for fixing the second section of the airbag to the roof strut prior to inflation and wherein during inflation at least a portion of the second section of the airbag becomes detached from the roof strut via the detachable holding means.

2. The airbag device according to claim 1, wherein the second section of the airbag comprises an end region distant from the folding point, and wherein the second section of the airbag is configured to cover a front A-pillar of the motor vehicle when the airbag is inflated, and the detachable holding means near the end region for fixing the second section of the airbag to the roof strut prior to inflation.

3. The airbag device according to claim 2, wherein at least one additional fastening means permanently fastens the second section of the airbag to the roof strut between the detachable holding means and the folding point.

4. The airbag device according to claim 2, wherein the detachable holding means comprises a portion of a sun visor mount on the roof strut.

5. The airbag device according to claim 2, wherein the detachable holding means is configured as a shackle having a predetermined break point.

6. The airbag device according to claim 2, wherein the detachable holding means is configured as a detachable clip.

7. The airbag device according to claim 3, wherein the at least one additional fastening means comprises a portion of a sun visor mount on the roof strut.

8. The airbag device according to claim 3, wherein the detachable holding means comprises a portion of a sun visor mount on the roof strut.

9. The airbag device according to claim 3, wherein during inflation the at least one additional fastening means and the detachable holding means cooperate to position a portion of the airbag proximate a transition between the roof frame and an A-pillar, which is adjacent to the windshield, so as to have a shape corresponding to a zigzag.

10. The airbag device according to claim 1, wherein the second section of the airbag is permanently fastened to the roof strut by at least one additional fastening means, and further wherein the at least one additional fastening means comprises a portion of a sun visor mount on the roof strut.

11. The airbag device according to claim 10, wherein the second section of the airbag extends beyond the at least one additional fastening means and further wherein an end region of the second section of the airbag, distant from the folding point, is fixed to the roof strut by the detachable holding means.

12. The airbag device according to claim 1, further comprising a plurality of single chambers arranged in the airbag, the longitudinal axis of each chamber being aligned at the an angle between 30° and 60° to the vertical in the same direction of inclination as a front A-pillar.

13. The airbag device according to claim 12, wherein the longitudinal axis of the chambers is an angle of 45° to the vertical.

14. The airbag device according to claim 1, wherein the airbag comprises a plurality of single chambers, the longitudinal axis of each chamber having an inclination corresponding to the degree of inclination exhibited by a front A-pillar.

\* \* \* \* \*